April 26, 1932.  F. R. NEWMAN  1,855,361
DEHAIRING MACHINE
Filed July 10, 1931

INVENTOR:
FRED R. NEWMAN.
BY Arthur C. Eckert
ATTORNEY

Patented Apr. 26, 1932

1,855,361

UNITED STATES PATENT OFFICE

FRED R. NEWMAN, OF ST. LOUIS, MISSOURI

DEHAIRING MACHINE

Application filed July 10, 1931. Serial No. 549,832.

This is an improvement on the auxiliary scraper disclosed in my patent application for de-hairing machines, filed November 29, 1929, Serial No. 410,397, allowed June 19, 1931, the patent for which will issue July 28, 1931 and bears Number 1,815,929. For the detailed operation of a de-hairing machine, that application supplies the information.

The machine is principally used for de-hairing hogs. The hog when properly positioned, is positioned in supports and rotated in the direction of the arrows in Fig. 1 of this application. The principal scraper is presented to the animal at the bottom, so that the scraping action on the hide of the hog is against the grain. The auxiliary scraper is presented to the animal on the opposite side of the animal, so that here again the scraping action is against the grain of the bristles.

In the auxiliary scraper described in my former application, herein indicated, the scraper blades or hooks are positively positioned, so that they all are in the same place at all times and are not yielding. Since the contour of the body of the animal is irregular, scraper blades that are not yielding, do not perform their function as efficiently as would yielding blades. In other words, the blades must be yielding to an extent that they may be raised or lowered slightly, so as to permit the scraper blades and hooks to ride over the irregularities on the animal body.

My invention consists specifically, therefore, in providing yielding auxiliary scraper blades or scraper paddles. My improvement may be made cheaply and of few and simple parts that lend themselves readily to multiple production. The device may be easily attached to a de-hairing machine of the type described in my former application, and the device may be easily substituted for the auxiliary scraper described and claimed in said former application.

With these and other objects in view, my invention has relation to certain novel features of construction and arrangement of parts as will be hereinafter more fully described, pointed out in the claim and illustrated in the drawings, in which Fig. 1 is an end elevation of one of the animal supports with the animal in de-hairing position, and with the main and auxiliary scrapers in functioning position.

Numeral 4 designates one of a series of animal supports.

Numeral 5 designates the animal that is to be de-haired. In this application, applicant is not concerned with the method or means of bringing the animal to the position shown in Fig. 1.

Figure 1:
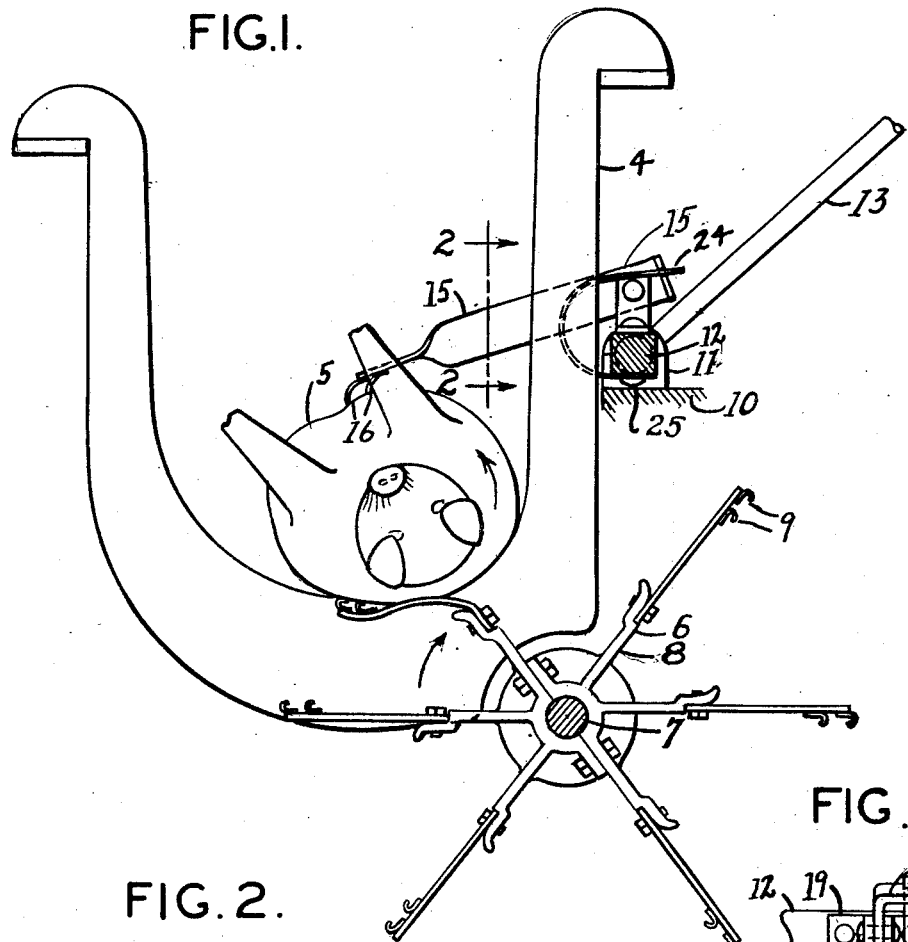
Figure 2:
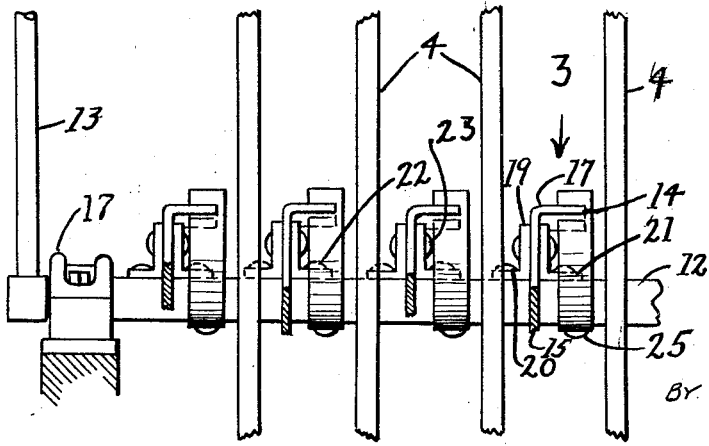
Fig. 2 is an elevation partly in section in the direction of the arrow shown by 2—2 in Fig. 1. In this view, several scrapers are shown together with the shaft supporting them, and the journal for supporting the shaft and the handle for oscillating the shaft together with the animal supports positioned between the scrapers.
Figure 3:
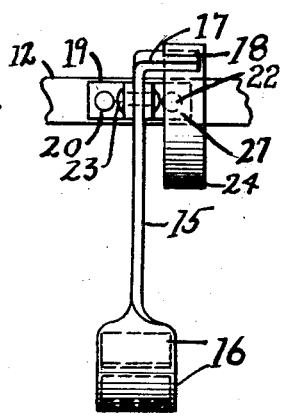
Fig. 3 is an enlarged detail of the structure of the single scraper, together with its supporting means looking in the direction of the arrow marked 3 in Fig. 2.

Numeral 6 designates the principal scraper, which is mounted on the shaft 7. The principal scraper 6 is formed of the spokes. At the end of each spoke is secured the scraper hooks 9. The shaft 7 is rotated by any conventional means so as to rotate the principal scraper 6 in the direction shown by the arrows in Fig. 1, so that the scraper hooks 9 will come in contact with the animal 5, as shown in Fig. 1. The structure thus far described is conventional. On the platform 10 are secured two journal boxes 11 in spaced relationship. The shaft 12 is journalled in the journal boxes 11. The platform 10, journal box 11 and shaft 12 are positioned at the side of the animal supports 4, as shown in Fig. 1. Numeral 13 designates a rod secured to the shaft 12, as shown in Fig. 2. It will be seen that by the oscillation of the rod 13 that the shaft 12 may be oscillated in the journal boxes 11. Numeral 14 designates one of my scraper paddles, which are secured to the shaft 12 by means to be subsequently described, and which are positioned on the shaft 12, so as to extend between animal supports 4. The scraper paddles 14 are identical, so that the description of one will suffice for all. Each scraper paddle 14 comprises an arm 15 on the one end of which are secured two scraper hooks 16. The scraper hooks 16 are twisted at an angle of ninety degrees, with the arm 15. The other end of the arm 15 is bent at right angles to form the finger 17. In the finger 17 is formed a slot 18.

Numerals 19 designate an angle iron secured to the shaft 12 by means of the bolt 20. Numeral 21 designates an angle iron secured to the shaft 12 by means of the bolt 22. The parallel portions of the angle irons 19 and 21 are spaced apart sufficiently to permit positioning the arm 15 between them. Through holes in the parallel portions of the angle irons 19 and 21, and through a hole in the arm 15, the bolt 23 is passed. By these means the arm 15 is pivotally mounted on the shaft 12.

Numeral 24 describes a U shaped spring secured to the underside of the shaft 12 by means of the bolt 25. The U shaped spring 24, on account of its shape, passes forwardly upwardly and then rearwardly and is of sufficient length to have its end pass into the slot 18. The arm 15 is of such width so as not to permit the oscillation of the arm 15 below that position shown in Fig. 1. When the arm 15 is raised upwardly, the movement is accomplished against the action of the U shaped spring 24, that is the spring 24 holds the arm 15 in its normal position shown in Fig. 1. In operation the scraper hooks 16 come in contact with the surface of the body of the animal. When a protuberance or enlargement is reached the scraper hooks 16 are raised against the compression of the U shaped spring 24, so that the scraper hooks 16 are permitted to rise upwardly, but are held in contact with the animal by means of the U shaped spring 24. The rod 13 permits the oscillation of the shaft 12 to the operating position shown in Fig. 1.

When the animal has been de-haired, the shaft 12, by means of the rod 13 may be rotated, but slightly away from the animal to permit its removal without damaging the scraper hooks 16 or the arm 15. The rod 13 may be manually or mechanically operated.

What I claim is:

In combination with a shaft, an arm, angle irons secured to said shaft, said arm secured to said angle irons, permitting oscillation of said arm, scraper hooks secured to said arm, a U shaped spring secured to said shaft at one end, and its other end positioned in a slot in the end of said arm opposite said scraper hooks, said shaft positioned in journal boxes, a rod secured to said shaft.

In testimony whereof I affix my signature.

FRED R. NEWMAN.